United States Patent
Iorio et al.

(10) Patent No.: US 8,114,225 B2
(45) Date of Patent: Feb. 14, 2012

(54) SOFT MAGNETIC MATERIALS

(75) Inventors: Luana Emiliana Iorio, Clifton Park, NY (US); Pazhayannur Ramanathan Subramanian, Niskayuna, NY (US); Michael Francis Xavier Gigliotti, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 835 days.

(21) Appl. No.: 12/107,818

(22) Filed: Apr. 23, 2008

(65) Prior Publication Data

US 2008/0220236 A1    Sep. 11, 2008

Related U.S. Application Data

(62) Division of application No. 11/260,430, filed on Oct. 27, 2005, now abandoned.

(51) Int. Cl.
*H01F 1/147* (2006.01)

(52) U.S. Cl. ......... 148/306; 148/311; 148/313; 148/315

(58) Field of Classification Search ........................ None
See application file for complete search history.

(56) References Cited

U.S. PATENT DOCUMENTS

| | | | | |
|---|---|---|---|---|
| 5,028,280 A | * | 7/1991 | Ihara et al. | 148/306 |
| 5,049,209 A | * | 9/1991 | Sakakima et al. | 148/306 |
| 5,484,491 A | * | 1/1996 | Iwasaki et al. | 148/313 |
| 6,778,358 B1 | | 8/2004 | Jiang et al. | |
| 2007/0102198 A1 | * | 5/2007 | Oxford et al. | 175/374 |

FOREIGN PATENT DOCUMENTS

| | | |
|---|---|---|
| DE | 199 36 040 A1 * | 7/1999 |
| JP | 62-89310 * | 4/1987 |

OTHER PUBLICATIONS

Li et al., "Magnetic Properties of Fe70-xCo30-yNx+y Thin Films", Applied Surface Science, vol. 244, pp. 477-480, 2005.

Craus et al., Soft Magnetism in Nitrided Fe93Ni4Cr3 and Fe94Ni4Ti2 Cold-Rolled Alloys, Journal of Magnetism and Magnetic Materials, vol. 263, pp. 47-56, 2003.

* cited by examiner

*Primary Examiner* — John Sheehan
(74) *Attorney, Agent, or Firm* — Paul J. DiConza

(57) ABSTRACT

An article including a monolithic body including iron, cobalt, and nitrogen is provided. The monolithic body includes a matrix phase and a plurality of particles disposed within the matrix phase. The particles include a phase comprising nitrogen.

19 Claims, No Drawings

SOFT MAGNETIC MATERIALS

This application is a divisional of application Ser. No. 11/260,430, filed 27 Oct. 2005, which is hereby incorporated by reference in its entirety.

BACKGROUND OF THE INVENTION

The invention is related to a soft magnetic material. More particularly, the invention is related to a soft magnetic material comprising iron, cobalt, and nitrogen. The invention is also related to a method for making a soft magnetic material.

Soft magnetic materials play a key role in a number of applications, especially in electric and electromagnetic devices. There is a growing need for lightweight, and compact electric generators. Compact machine designs may be realized through an increase in the rotational speed of the machine. In order to operate at very high speeds, these machines need rotors with higher yield strength materials along with lower magnetic core losses, as well as the ability to operate at maximum flux densities. Generally, achieving high strength and superior magnetic performance concurrently is difficult in conventional materials, because high strength typically is obtained at the expense of magnetic properties such as magnetic saturation and core loss. Therefore, there is a need for a soft magnetic material with superior magnetic properties and higher mechanical strength when compared with currently available materials. There is a further need for a method for producing these materials.

BRIEF DESCRIPTION OF THE INVENTION

The present invention meets these and other needs by providing a soft magnetic material with substantially high yield strength, substantially high resistivity, and improved magnetic properties.

One aspect of the invention is to provide an article including a monolithic body including iron, cobalt, and nitrogen. The monolithic body includes a matrix phase and a plurality of particles disposed within the matrix phase. The particles include a phase comprising nitrogen.

A second aspect of the invention is to provide an article. The article is a component of an electric machine including a generator, a motor, an alternator, a magnetic bearing, an electromagnet pole piece, an actuator, an armature, a solenoid, an ignition core, or a transformer.

DETAILED DESCRIPTION OF THE INVENTION

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

Core loss, an important parameter in soft magnetic materials, is the sum of hysteresis loss and eddy current loss. Because core loss represents inefficiency, it is generally sought to be minimized in component designs. Hysteresis loss results from the fact that not all energy required to magnetize a material is recoverable when it is demagnetized. Eddy current loss is the result of circulating currents that are induced when the flux density changes in the magnetic material. The amplitude of these currents is dependent on the frequency of the applied field and the electrical resistivity of the material.

For many applications, magnetic materials with high permeability, high saturation magnetization, low core loss, and high mechanical strength are preferred. Therefore, there is a continuing need for magnetic materials with improved magnetic properties and mechanical strength.

As used herein, a "monolithic body" means a three-dimensional body portion constituting a single unit without joint. This is in contrast to a body formed of multiple components, such as a laminated, or a multi-layered structure. Thickness of the monolithic body as used herein refers to the smallest of the length, width, and depth dimensions of the body.

In a particular embodiment, a monolithic body comprises a soft magnetic alloy comprising iron (Fe), cobalt (Co), and nitrogen (N). The monolithic body includes particles comprising a phase comprising nitrogen disposed within the monolithic body. In some embodiments, the particles may be uniformly dispersed and in other embodiments the particles may be disposed in a non-random arrangement, such as a graded dispersion. The monolithic body has a thickness of at least about 100 micrometers. In some embodiments, the monolithic body has a thickness in the range from about 100 micrometers to about 400 micrometers. In other embodiments, the monolithic body has a thickness in the range from about 1 mm to about 50 mm. In other embodiments, the monolithic body has a thickness in the range from about 10 mm to about 200 mm. The monolithic body may be in any form or shape such as a sheet, tube, bar, or a block.

In one embodiment, cobalt is present in the monolithic body in the range from about 15 atomic percent to about 55 atomic percent. In another embodiment, the monolithic body comprises cobalt in the range from about 30 atomic percent to about 40 atomic percent. In one embodiment, the monolithic body comprises Co in the range from about 45 atomic percent to about 52 atomic percent. The amount of cobalt may be chosen to optimize the mechanical processability and the magnetic properties of the alloy. Nitrogen in the form of nitrides and interstitial nitrogen in Fe—Co soft magnetic material is expected to increase the yield strength and increase the resistivity. The bulk resistivity and hence the eddy current loss of the magnetic structure can be controlled by controlling the amount of nitrogen introduced. In one embodiment, the monolithic body comprises nitrogen in an amount less than about 6 atomic percent. In one embodiment, the monolithic body comprises nitrogen in the range from about 0.05 atomic percent to about 2 atomic percent. In another embodiment, the monolithic body phase comprises nitrogen in the range from about 0.5 atomic percent to about 1 atomic percent. The amount of nitrogen may be optimized to obtain desired mechanical and electrical properties. The alloys of the invention desirably exhibit high saturation magnetization $B_s$ and high Curie temperatures $T_c$ ($T_c \approx 900°$ C.). In one embodiment, magnetic material of the invention has a saturation magnetization of at least about 1.8 T. In another embodiment, magnetic material of the invention has a saturation magnetization at least about 2 T. The high saturation magnetization values allow the material to be operated at very high flux densities, enabling compact electric machine designs, and the high Curie temperature enables the machine to operate at elevated temperatures.

Nitride-forming elements combine with the nitrogen present in the alloy to form a phase comprising nitrogen such as a nitride, an oxynitride, or a carbonitride. In some embodiments, the Fe—Co based soft magnetic material includes a (meaning at least one) nitride forming element ("nitride-former"). Examples of nitride-formers include, but are not limited to, vanadium, niobium, zirconium, hafnium, chromium, titanium, tantalum, silicon, boron, and aluminum. In some embodiments more than one nitride-former may be present. Specific combinations of nitride-formers are chosen based on the particular requirements of specific applications. In one embodiment, the monolithic body comprises a nitride-former in an amount in a range from about 0.05 to about 3 atomic percent. Typically, the amount of nitride-former introduced is less than that amount required to consume all nitrogen present in the matrix, leaving some residual nitrogen within the matrix phase. Those skilled in the art understand how to calculate the required relative amounts of nitrogen and nitride former to achieve a desired amount of nitrogen unconsumed. In some embodiments, the amount of nitride-former introduced is such that at least 50 parts per million of nitrogen is left unconsumed within the matrix.

The nitrogen containing phases may take the form of a dispersion of very fine particles in the matrix of the magnetic material. The particles may serve to pin the grain boundaries within the material during processing and may yield a fine-grained structure, thereby improving the mechanical strength. The particle grain boundary pinning could provide for a thermally stable fine-grained material and also prevent the degradation of magnetic properties during high temperature service. In some embodiments, the particles are present in the monolithic body in an amount up to about 5 volume percent. In some embodiments, the particles are present in the monolithic body in an amount in the range from about 0.1 volume percent to about 0.5 volume percent. In some embodiments, the particles have a median dimension not more than about 500 nanometers. In some embodiments, the particles have a median dimension not more than about 100 nanometers. The phase comprising nitrogen may comprise a nitride, an oxynitride, or a carbonitride. It may also be a "mixed" nitride, that is, a nitride of more than one metallic element.

The particles need not necessarily be spherical in shape. When particles have a substantially spherical shape, the dimension of the particle is generally taken to be the diameter of the particle. When the particles are non-spherical the "effective" particle dimension is characterized in the art by the diameter of a theoretical sphere of equivalent volume to that of the actual non-spherical particle. It will be understood that the terms "median particle dimension" and "median particle size" as used herein refer to this "effective" particle size where particles are non-spherical, as well as to the actual particle diameter where the particles are spherical.

As mentioned above, the grain size of the material affects a combination of magnetic properties and mechanical properties. The particles are stable at high temperatures and are effective in pinning grains via the Zener-pinning mechanism. Accordingly, in one embodiment, the matrix material has a median grain size not more than about 0.5 millimeter. In certain embodiments, the matrix magnetic material has a median grain size not more than about 10 microns, and in particular embodiments the median grain size is in a range from about 100 nm to about 2 microns. Typically the grain size is bigger than the size of the particle.

Nitrogen maybe introduced into the Fe—Co matrix by a number of techniques. In some embodiments, iron-cobalt alloy is cryomilled in liquid nitrogen to create iron-cobalt alloy powder with enhanced nitrogen levels. Cryomilling may additionally yield fine particle size. In other embodiments, ion plasma nitriding or gas nitriding is used to make iron-cobalt-based alloys with nitrogen. In other embodiments, nitrogen ion implantation is utilized to make iron-cobalt-based alloys with nitrogen. Pressure infiltration of nitrogen into Fe—Co alloy melts may also be used. The processing technique is chosen depending on the desired nitrogen level and the dimensions of the monolithic component being fabricated.

The article of the present invention may have a wide variety of applications. In some embodiments, the article is a portion of a rotor or a stator of an electric machine including a generator, a motor, or an alternator. In some embodiments, the article may be a component of a magnetic bearing, an electromagnet pole piece, an actuator, an armature, a solenoid, an ignition core, or a transformer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An article comprising:
a monolithic body comprising iron, cobalt, and nitrogen; wherein the monolithic body comprises a soft magnetic material matrix phase and a plurality of particles disposed within the matrix phase, the particles are present in the monolithic body in an amount up to about 5 volume percent and comprising a phase comprising nitrogen, wherein the matrix phase has a median grain size in the range from about 100 nanometers to about 2 microns and the monolithic body has a saturation magnetization of at least about 1.8 T.

2. The article according to claim 1, wherein the monolithic body has a thickness of at least about 100 micrometers.

3. The article according to claim 2, wherein the monolithic body has a thickness in the range from about 500 micrometers to about 200 millimeters.

4. The article according to claim 2, wherein the monolithic body has a thickness in the range from about 700 micrometers to about 10 millimeters.

5. The article according to claim 1, wherein the matrix phase comprises cobalt in the range from about 15 atomic percent to about 55 atomic percent.

6. The article according to claim 5, wherein the matrix phase comprises cobalt in the range from about 30 atomic percent to about 40 atomic percent.

7. The article according to claim 5, wherein the matrix phase comprises cobalt in the range from about 45 atomic percent to about 52 atomic percent.

8. The article according to claim 1, wherein the monolithic body comprises nitrogen less than about 6 atomic percent.

9. The article according to claim 1, wherein the monolithic body comprises nitrogen in the range from about 0.05 atomic percent to about 2 atomic percent.

10. The article according to claim 1, wherein the monolithic body further comprises a nitride-former selected from the group consisting of Ti, V, Nb, Zr, Hf, Cr, Al, B, Si, Ta, and combinations thereof.

11. The article according to claim 10, wherein the monolithic body comprises the nitride-former in the range from about 0.05 atomic percent to about 3 atomic percent.

12. The article according to claim 1, wherein the particle comprises a nitride, an oxynitride, or a carbonitride.

13. The article according to claim 1, wherein the plurality of particles has a median particle size not more than about 1 micron.

14. The article according to claim 1, the plurality of particles has a median particle size not more than about 100 nanometers.

15. The article according to claim 1, wherein the article is a component of an electric device selected from the group consisting of a generator, a motor, and an alternator.

16. The article according to claim 15, wherein the article is an electric generator rotor.

17. The article according to claim 1, wherein the article is a component of a device selected from the group consisting of a magnetic bearing, an electromagnet pole piece, an actuator, an armature, a solenoid, an ignition core, or a transformer.

18. An article comprising:
 a monolithic body comprising iron, cobalt, and nitrogen; wherein the monolithic body comprises a soft magnetic material matrix phase and a plurality of particles disposed substantially throughout the matrix phase, wherein the matrix phase comprises cobalt in the range from about 30 atomic percent to about 40 atomic percent, and the particles are present in an amount up to about 5 volume percent, wherein the matrix phase has a median grain size in the range from about 100 nanometers to about 2 microns and the monolithic body has a saturation magnetization of at least about 1.8 T.

19. An article comprising:
 a monolithic body comprising iron, cobalt, and nitrogen; wherein the monolithic body comprises a soft magnetic material matrix phase and a plurality of particles disposed substantially throughout the matrix phase, wherein the matrix phase comprises cobalt in the range from about 45 atomic percent to about 52 atomic percent, and the particles are present in an amount up to about 5 volume percent, wherein the matrix phase has a median grain size in the range from about 100 nanometers to about 2 microns and the monolithic body has a saturation magnetization of at least about 1.8 T.

* * * * *